United States Patent
Peng et al.

(10) Patent No.: US 11,251,624 B2
(45) Date of Patent: Feb. 15, 2022

(54) ENERGY EFFICIENCY CONTROL METHOD, CONTROL APPARATUS, AND COMMUNICATIONS DEVICE

(71) Applicant: Huawei Technologies Co., Ltd., Shenzhen (CN)

(72) Inventors: Jianhua Peng, Shenzhen (CN); Xingjie Wang, Dongguan (CN); Tao Feng, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/239,079

(22) Filed: Apr. 23, 2021

(65) Prior Publication Data

US 2021/0242687 A1 Aug. 5, 2021

Related U.S. Application Data

(63) Continuation of application No. PCT/CN2019/084782, filed on Apr. 28, 2019.

(30) Foreign Application Priority Data

Oct. 25, 2018 (CN) .......................... 201811251302.0

(51) Int. Cl.
*G05F 3/06* (2006.01)
*H02J 5/00* (2016.01)
*H04W 52/38* (2009.01)

(52) U.S. Cl.
CPC .............. *H02J 5/00* (2013.01); *H04W 52/38* (2013.01)

(58) Field of Classification Search
CPC ........ G06F 1/3203; G06F 1/26; G06F 1/3296; Y02B 60/1217; Y02B 60/1285; G05F 3/06; G05F 1/32; H01F 29/04; H02M 5/08

(Continued)

(56) References Cited

U.S. PATENT DOCUMENTS 6,789,177 B2 * 9/2004 Okada ................. G06F 21/10
375/E7.009
9,886,048 B2 2/2018 Du et al.
(Continued)

FOREIGN PATENT DOCUMENTS

CN 101626159 A 1/2010
CN 101689812 A 3/2010
(Continued)

*Primary Examiner* — Quan Tra
(74) *Attorney, Agent, or Firm* — Leydig, Voit & Mayer, Ltd.

(57) ABSTRACT

An energy efficiency control method and apparatus are provided. The method, implemented by a communications device comprising a primary power supply, a secondary power supply, and a control apparatus, includes: obtaining a current load rate of the primary power supply and a load power of the secondary power supply; determining, based on the obtained current load rate and the load power, a target output voltage of the primary power supply and a target input voltage of the secondary power supply that satisfy an energy efficiency requirement of the communications device, wherein energy efficiency of the communications device is related to the energy efficiency of the primary power supply and the energy efficiency of the secondary power supply; and controlling the primary power supply to output the target output voltage, and controlling an input voltage of the secondary power supply to be the target input voltage.

18 Claims, 8 Drawing Sheets

(58) Field of Classification Search
USPC .......................................................... 307/151
See application file for complete search history.

(56) References Cited

U.S. PATENT DOCUMENTS

| | | | |
|---|---|---|---|
| 2009/0265571 A1* | 10/2009 | Furukawa | ................ G06F 1/266 |
| | | | 713/340 |
| 2012/0105028 A1 | 5/2012 | Hörman et al. | |
| 2013/0154600 A1* | 6/2013 | Giuliano | ............. H02M 3/1584 |
| | | | 323/304 |
| 2014/0274224 A1 | 9/2014 | Patel et al. | |
| 2015/0046728 A1 | 2/2015 | Ma et al. | |

FOREIGN PATENT DOCUMENTS

| | | |
|---|---|---|
| CN | 202172451 U | 3/2012 |
| CN | 102904343 A | 1/2013 |
| CN | 102967018 A | 3/2013 |
| CN | 103165201 A | 6/2013 |
| CN | 106096874 A | 11/2016 |
| CN | 107734613 A | 2/2018 |
| CN | 107844185 A | 3/2018 |
| CN | 107959421 A | 4/2018 |
| CN | 109587774 A | 4/2019 |
| EP | 2887180 A1 | 6/2015 |

\* cited by examiner

ENERGY EFFICIENCY CONTROL METHOD, CONTROL APPARATUS, AND COMMUNICATIONS DEVICE

CROSS-REFERENCE TO RELATED APPLICATIONS

This application is a continuation of International Application No. PCT/CN2019/084782, filed on Apr. 28, 2019, which claims priority to Chinese Patent Application No. 201811251302.0, filed on Oct. 25, 2018. The disclosures of the aforementioned applications are hereby incorporated by reference in their entireties.

TECHNICAL FIELD

Embodiments of this application relate to the field of communication energy technologies, and specifically relates to an energy efficiency control method, a control apparatus, and a communications device.

BACKGROUND

In the communication energy field, green communication and energy saving indicators are industry trends. Particularly, network requirements of users are rapidly increasing currently, end load is greatly increased in various communication scenarios. The increase of the end load inevitably leads to an increase in an energy loss.

In various scenarios in which a communication loss is generated, a communications site (base station) is used as an example. When normal operation of components in the communications site is ensured, not only a primary power supply needs to be used, but also a secondary power supply needs to be used. A primary power supply is usually an alternating current/direct current conversion power supply, a secondary power supply is usually a direct current/direct current conversion power supply, and there are energy losses during use and conversion of both the primary power supply and the secondary power supply.

During use and conversion of a power supply, an energy saving method that is usually used is to perform energy saving improvement on each component. However, energy saving improvement on a specific component needs to rely on the industry development of the specific component, an energy saving effect is limited, and more energy saving components usually mean higher costs. Therefore, how to effectively save energy in the communication scenario has always been a problem that needs to be urgently resolved in the current industry.

SUMMARY

Embodiments of this application provide an energy efficiency control method, to implement high energy efficiency management and control through cooperative control of a primary power supply and a secondary power supply in a communications device, thereby effectively reducing an energy loss of the communications device. The embodiments of this application further provide a corresponding control apparatus and a communications device.

A first aspect of this application provides an energy efficiency control method, where the method is applied to a communications device; the communications device includes a primary power supply, a secondary power supply, and a control apparatus; the communications device may be a base station or another network device, or may be a terminal device; the primary power supply is usually an alternating current/direct current conversion power supply, and the secondary power supply is usually a direct current/direct current conversion power supply; and the control apparatus may be a device into which an energy efficiency control function in this application is integrated. The method includes: obtaining, by the control apparatus, a current load rate of the primary power supply and a load power of the secondary power supply, where energy efficiency of the primary power supply is related to the load rate of the primary power supply, and energy efficiency of the secondary power supply is related to the load power of the secondary power supply; determining, by the control apparatus based on the current load rate of the primary power supply and the load power of the secondary power supply, a target output voltage of the primary power supply and a target input voltage of the secondary power supply that satisfy an energy efficiency requirement of the communications device, where energy efficiency of the communications device is related to the energy efficiency of the primary power supply and the energy efficiency of the secondary power supply; and controlling, by the control apparatus, the primary power supply to output the target output voltage, and controlling an input voltage of the secondary power supply to be the target input voltage. It can be learned from the foregoing first aspect that, the control apparatus can adjust an output voltage of the primary power supply and the input voltage of the secondary power supply based on the load rate of the primary power supply and the load power of the secondary power supply, so that both the primary power supply and the secondary power supply work in a relatively high energy-efficiency state, so as to effectively reduce an energy loss of the communications device.

Optionally, with reference to the first aspect, in a first possible implementation, during the obtaining a current load rate of the primary power supply and a load power of the secondary power supply, the method further includes: obtaining, by the control apparatus, a current input voltage of the secondary power supply, where the energy efficiency of the secondary power supply is related to the input voltage of the secondary power supply at the load power, and the input voltage of the secondary power supply is related to an output voltage of the primary power supply, and the step, in the foregoing first aspect, of determining, by the control apparatus based on the current load rate of the primary power supply and the load power of the secondary power supply, a target output voltage of the primary power supply and a target input voltage of the secondary power supply that satisfy an energy efficiency requirement of the communications device may include: determining, by the control apparatus, whether the current load rate of the primary power supply is within a first load rate interval, and determining whether the current input voltage of the secondary power supply is within a first voltage interval at the load power of the secondary power supply, where energy efficiency corresponding to the first load rate interval is higher than energy efficiency corresponding to a second load rate interval, and energy efficiency corresponding to the first voltage interval is higher than energy efficiency corresponding to a second voltage interval; and if the current load rate is within the first load rate interval and the current input voltage of the secondary power supply is within the first voltage interval, determining, by the control apparatus, a current output voltage of the primary power supply as the target output voltage of the primary power supply, and determining the current input voltage of the secondary power supply as the target input voltage of the secondary power supply. It can be learned from the first possible implementation of the first aspect that, when both the current load rate of the primary power supply and the current input voltage of the secondary power supply are within intervals corresponding to relatively high energy efficiency, no further adjustment is required.

Optionally, with reference to the first possible implementation of the first aspect, in a second possible implementation, the method further includes: if the current load rate is within the first load rate interval and the current input voltage of the secondary power supply is not within the first voltage interval, adjusting, by the control apparatus, the input voltage of the secondary power supply to a first input voltage, where the first input voltage is within the first voltage interval; and if a first updated load rate, corresponding to the first input voltage, of the primary power supply is within the first load rate interval after the input voltage of the secondary power supply is adjusted to the first input voltage, determining, by the control apparatus, an output voltage, corresponding to the first updated load rate, of the primary power supply as the target output voltage, and determining the first input voltage as the target input voltage. It can be learned from the foregoing second possible implementation that, if the input voltage of the secondary power supply is not within a relatively good voltage interval, the input voltage of the secondary power supply needs to be adjusted first, and then a load rate of the primary power supply is determined; and if the load rate of the primary power supply is still within a relatively good load rate interval, an adjusted output voltage of the primary power supply and an adjusted input voltage of the secondary power supply may be determined. This manner of performing adjustment as required can improve adjustment efficiency.

Optionally, with reference to the second possible implementation of the first aspect, in a third possible implementation, the method further includes: if the first updated load rate, corresponding to the first input voltage, of the primary power supply is not within the first load rate interval after the input voltage of the secondary power supply is adjusted to the first input voltage, adjusting a quantity of working sub power supplies in the primary power supply, so that a second updated load rate of the primary power supply is within the first load rate interval. It can be learned from the third possible implementation that, if a load rate of the primary power supply is not within a relatively good load rate interval after the input voltage of the secondary power supply is adjusted, the primary power supply needs to be adjusted again, so that the load rate of the primary power supply returns to the relatively good load rate interval.

Optionally, with reference to the first possible implementation of the first aspect, in a fourth possible implementation, the determining, by the control apparatus based on the current load rate of the primary power supply and the load power of the secondary power supply, a target output voltage of the primary power supply and a target input voltage of the secondary power supply that satisfy an energy efficiency requirement of the communications device may include: determining, by the control apparatus, whether the current load rate of the primary power supply is within the first load rate interval, where the energy efficiency corresponding to the first load rate interval is higher than the energy efficiency corresponding to the second load rate interval; if the current load rate is not within the first load rate interval, adjusting, by the control apparatus, a quantity of working sub power supplies in the primary power supply, so that a third updated load rate of the primary power supply after the working sub power supply adjustment is performed is within the first load rate interval; and if a second input voltage, corresponding to the third load rate, of the secondary power supply is within the first voltage interval after the quantity of working sub power supplies is adjusted, determining, by the control apparatus, an output voltage, corresponding to the third updated load rate, of the primary power supply as the target output voltage, and determining the second input voltage as the target input voltage, where the energy efficiency corresponding to the first voltage interval is higher than the energy efficiency corresponding to the second voltage interval. It can be learned from the foregoing fourth possible implementation that, the load rate of the primary power supply is not within a relatively good load rate interval, the primary power supply needs to be adjusted, so that the load rate of the primary power supply is within the relatively good load rate interval; and if the input voltage of the secondary power supply is also within a relatively good voltage interval after the quantity of working sub power supplies in the primary power supply is adjusted, the adjustment is ended, and the target output voltage of the primary power supply and the target input voltage of the secondary power supply are determined.

Optionally, with reference to the fourth possible implementation of the first aspect, in a fifth possible implementation, the adjusting, by the control apparatus, a quantity of working sub power supplies in the primary power supply, so that a third updated load rate of the primary power supply after the sub power supply adjustment is performed is within the first load rate interval may include: if the current load rate is greater than a maximum value of the first load rate interval, increasing, by the control apparatus, the quantity of working sub power supplies in the primary power supply, so that a third load rate of the primary power supply after the adjustment is performed falls within the first load rate interval. It can be learned from the fifth possible implementation that, because load of the primary power supply is unchanged, and increasing the quantity of working sub power supplies may lead to an increase in an output power, the load rate of the primary power supply can be reduced by increasing the quantity of working sub power supplies.

Optionally, with reference to the fourth possible implementation of the first aspect, in a sixth possible implementation, the adjusting, by the control apparatus, a quantity of working sub power supplies in the primary power supply, so that a third updated load rate of the primary power supply after the sub power supply adjustment is performed is within the first load rate interval includes: if the current load rate is less than a minimum value of the first load rate interval, decreasing, by the control apparatus, the quantity of working sub power supplies in the primary power supply, so that a third load rate of the primary power supply after the adjustment is performed falls within the first load rate interval. It can be learned from the sixth possible implementation that, because load of the primary power supply is unchanged, and decreasing the quantity of working sub power supplies may lead to a decrease in an output power, the load rate of the primary power supply can be increased by decreasing the quantity of working sub power supplies.

Optionally, with reference to the fourth possible implementation of the first aspect, in a seventh possible implementation, the method further includes: if the second input voltage of the secondary power supply is not within the first voltage interval after the quantity of working sub power supplies is adjusted, adjusting, by the control apparatus, the input voltage of the secondary power supply to a third input voltage, where the third input voltage is within the first voltage interval; and if a third updated load rate of the primary power supply is still within the first load rate interval after the input voltage of the secondary power supply is adjusted to the third input voltage, determining, by the control apparatus, an output voltage corresponding to the third updated load rate as the target output voltage, and determining the third input voltage as the target input voltage.

Optionally, with reference to the seventh possible implementation of the first aspect, in an eighth possible implementation, the method further includes: if the third updated load rate of the primary power supply is not within the first load rate interval after the input voltage of the secondary power supply is adjusted to the third input voltage, performing working sub power supply adjustment on the primary power supply again, so that a fourth updated load rate of the primary power supply after the adjustment is performed falls within the first load rate interval.

Optionally, with reference to the first possible implementation of the first aspect, in a ninth possible implementation, the method further includes: determining, by the control apparatus according to a calculation function and based on the current load rate of the primary power supply, the load power of the secondary power supply, and the current input voltage of the secondary power supply, a target output voltage of the primary power supply and a target input voltage of the secondary power supply that are corresponding to best energy efficiency of the communications device. It can be learned from the ninth possible implementation that, the target output voltage of the primary power supply and the target input voltage of the secondary power supply can be determined by performing calculation once, so as to implement rapid control of the primary power supply and the secondary power supply.

A second aspect of this application provides a control apparatus, and the control apparatus has a function of implementing the method in the foregoing first aspect or any possible implementation of the first aspect. The function may be implemented by hardware, or may be implemented by hardware by executing corresponding software. The hardware or software includes one or more modules corresponding to the foregoing function.

A third aspect of this application provides a control apparatus, including: a processor and a memory, where the memory is configured to store a computer execution instruction, and when the control apparatus operates, the processor executes the computer execution instruction stored in the memory, so that the executive function network element performs the energy efficiency control method in the foregoing first aspect or any possible implementation of the first aspect.

A fourth aspect of this application provides a computer readable storage medium, where the computer readable storage medium stores an instruction, and when the instruction is run on a computer, the computer is enabled to perform the energy efficiency control method in the foregoing first aspect or any possible implementation of the first aspect.

A fifth aspect of this application provides a computer program product including an instruction, and when the instruction is run on a computer, the computer is enabled to perform the energy efficiency control method in the foregoing first aspect or any possible implementation of the first aspect.

A sixth aspect of this application provides a communications device, where the communications device includes a primary power supply, a secondary power supply, and a control apparatus, and the control apparatus is configured to perform the energy efficiency control method in the foregoing first aspect or any possible implementation of the first aspect.

In the embodiments of this application, an output voltage of the primary power supply and an input voltage of the secondary power supply can be controlled based on the current load rate of the primary power supply and the load power of the secondary power supply, so that both the primary power supply and the secondary power supply have relatively high energy efficiency, thereby reducing an energy loss of the communications device.

DESCRIPTION OF EMBODIMENTS

The following describes the embodiments of this application with reference to accompanying drawings. Apparently, the described embodiments are merely a part rather than all of the embodiments of this application. A person of ordinary skill in the art may learn that as a technology evolves and a new scenario emerges, the technical solutions provided in the embodiments of this application are also applicable to a similar technical problem.

Embodiments of this application provide an energy efficiency control method, to implement high energy efficiency management and control through cooperative control of a primary power supply and a secondary power supply in a communications device, thereby effectively reducing an energy loss of the communications device. The embodiments of this application further provide a corresponding control apparatus. The following provides detailed descriptions separately.

In many scenarios of life or work, devices that need power supply are used. A communication scenario is used as an example. Both a network device and a terminal device need to use power supplies for normal operation.

There may be a plurality of types of power supplies, such as a power supply in a substation and a power supply in a communications device. Power supplies in communications devices may be classified into primary power supplies and secondary power supplies. A primary power supply may also be referred to as an alternating current/direct current rectifier power supply, and can convert an alternating current to a direct current. A secondary power supply may also be referred to as a direct current/direct current conversion power supply, and can convert a direct current to a direct current, for example, convert 3.8 V to 2 V.

Figure 1:
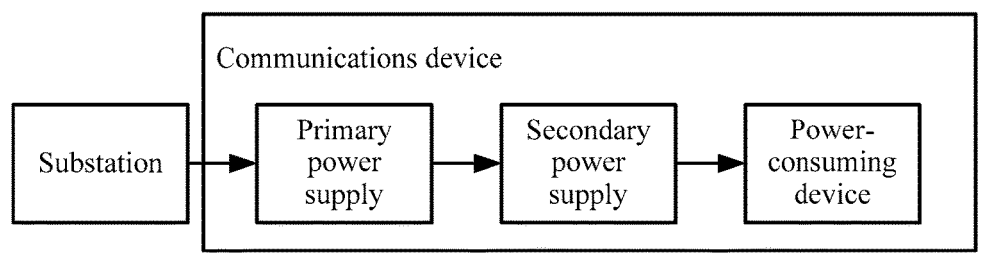
FIG. 1 is a schematic diagram of a structure example of a communications device according to an embodiment of this application.
Figure 2:
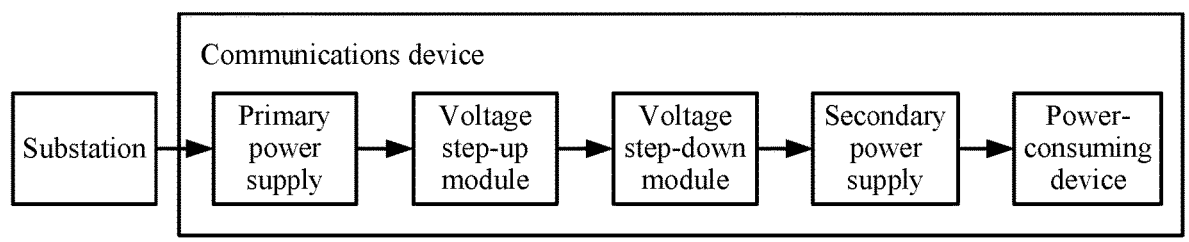
FIG. 2 is a schematic diagram of another structure of a communications device according to an embodiment of this application.

That a communications device is a base station is used as an example. FIG. 1 is a schematic diagram of another structure example of a communications device according to an embodiment of this application. To ensure normal operation of the base station, a substation needs to provide a power supply. When the substation provides an alternating current, a primary power supply of the communications device converts the alternating current to a direct current, and a secondary power supply converts a received direct current to a direct current required by a power-consuming device. FIG. 1 shows a case in which the primary power supply and the secondary power supply are directly connected. For some cases in which the primary power supply is relatively far from the secondary power supply, for example, when power is supplied to a remote radio unit in the base station, there are a voltage step-up module and a voltage step-down module between the primary power supply and the secondary power supply. FIG. 2 is a schematic diagram of another structure of a communications device according to an embodiment of this application. A voltage step-up module first converts, to a high-voltage direct current, a direct current output by a primary power supply; after the high-voltage direct current is transmitted on an electric wire for a distance to arrive at a voltage step-down module, the voltage step-down module converts the received high-voltage direct current to a low-voltage direct current; and then a secondary power supply receives the low-voltage direct current and converts the low-voltage direct current to a direct current of a voltage required by a power-consuming device, for the power-consuming device to operate.

Figure 3:
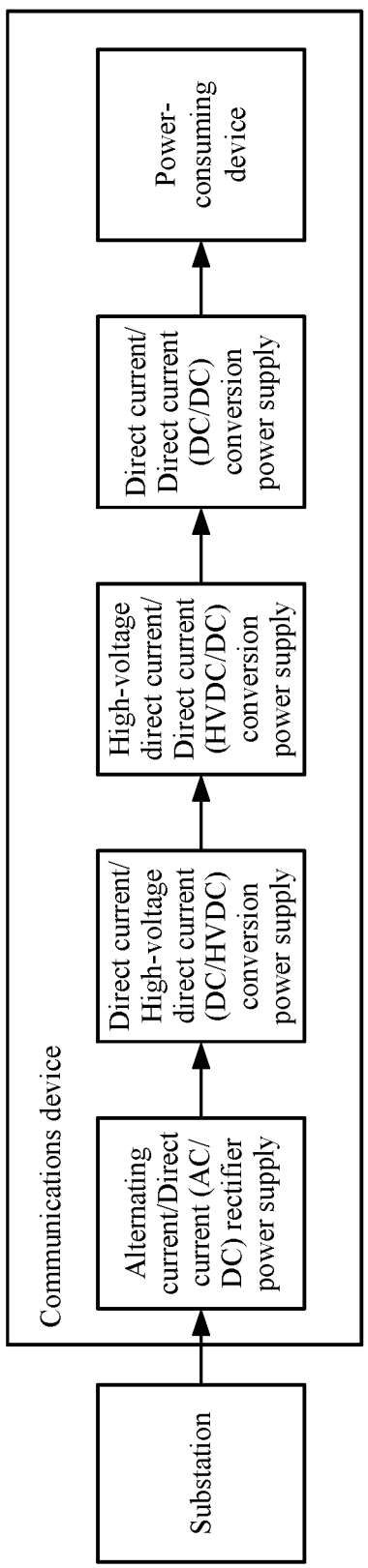
FIG. 3 is a schematic diagram of another structure example of a communications device according to an embodiment of this application.

The structure in FIG. 2 may alternatively be shown through FIG. 3. FIG. 3 is a schematic diagram of another structure example of a communications device according to an embodiment of this application. As shown in FIG. 3, a primary power supply is an alternating current/direct current (AC/DC) rectifier power supply, and a voltage step-up module, a voltage step-down module, and a secondary power supply are all direct current/direct current (DC/DC) conversion power supplies. The voltage step-up module increases a voltage of a direct current output by the primary power supply to obtain a high-voltage direct current (HVDC), and the voltage step-down module performs voltage reduction on the received high-voltage direct current. The secondary power supply receives a direct current obtained by the voltage step-down module through voltage reduction, and the secondary power supply converts the received direct current to a direct current of a voltage required by a power-consuming device, for the power-consuming device to operate.

Figure 4:
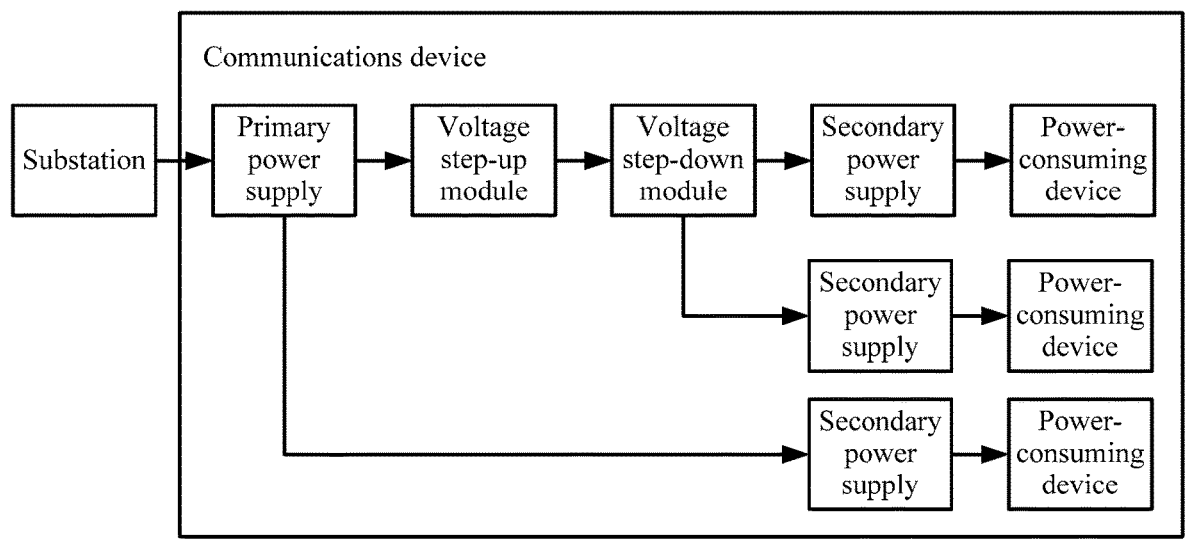
FIG. 4 is a schematic diagram of another structure example of a communications device according to an embodiment of this application.

In the communications device, there may be a plurality of secondary power supplies, and each secondary power supply supplies electric energy to its power-consuming device. FIG. 4 is a schematic diagram of another structure example of a communications device according to an embodiment of this application. Each secondary power supply and its power-consuming device are connected in parallel to another secondary power supply and its power-consuming device. A primary power supply supplies electric energy to all secondary power supplies and power-consuming devices inside the communications device. Load of the primary power supply is a sum of load of all the secondary power supplies.

Figure 5:
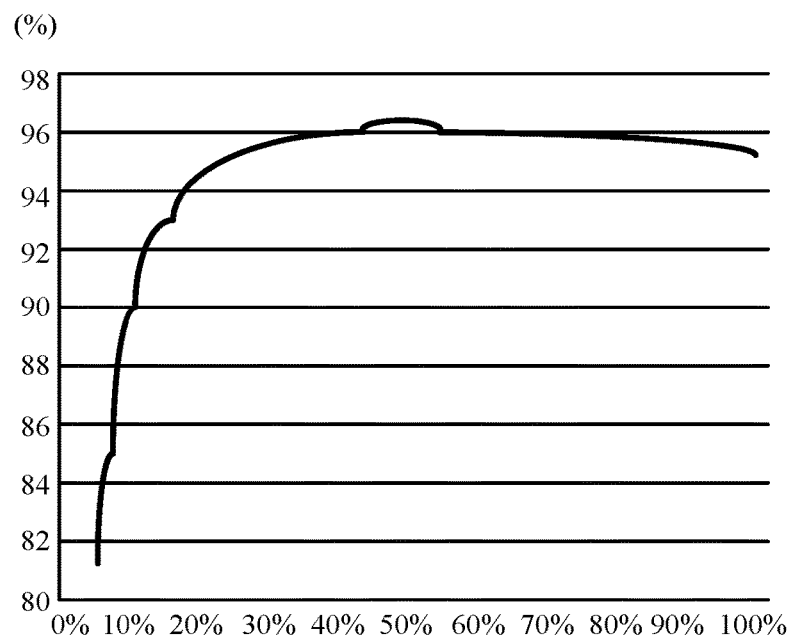
FIG. 5 is a diagram of a correspondence between energy efficiency and a load rate of a type of primary power supply according to an embodiment of this application.

Because not all power-consuming devices operate simultaneously, but electric energy output by the primary power supply each time is fixed, and this leads to energy efficiency of the primary power supply, that is, efficiency of effectively utilizing, by power-consuming devices, of the energy provided by the primary power supply is not fixed. If only one power-consuming device with relatively low power consumption operates, the energy efficiency of the primary power supply is very low, and a large amount of energy is wasted. Energy efficiency of the primary power supply is related to a load rate of the primary power supply. FIG. 5 is a diagram of a correspondence between energy efficiency and a load rate of a type of primary power supply according to an embodiment of this application. It can be seen from FIG. 5 that, when the load rate of this type of primary power supply is greater than 50%, the energy efficiency of the primary power supply is relatively high. Certainly, correspondences between load rates and energy efficiency of different types of primary power supplies may be slightly different, but the load rates are all related to energy efficiency. All the correspondences between load rates and energy efficiency of different types of primary power supplies may be obtained through detection. Therefore, energy efficiency control may be performed with reference to a load rate of a primary power supply. The load rate is a ratio of energy consumption of load supported by the primary power supply to energy output by the primary power supply.

Figure 6:
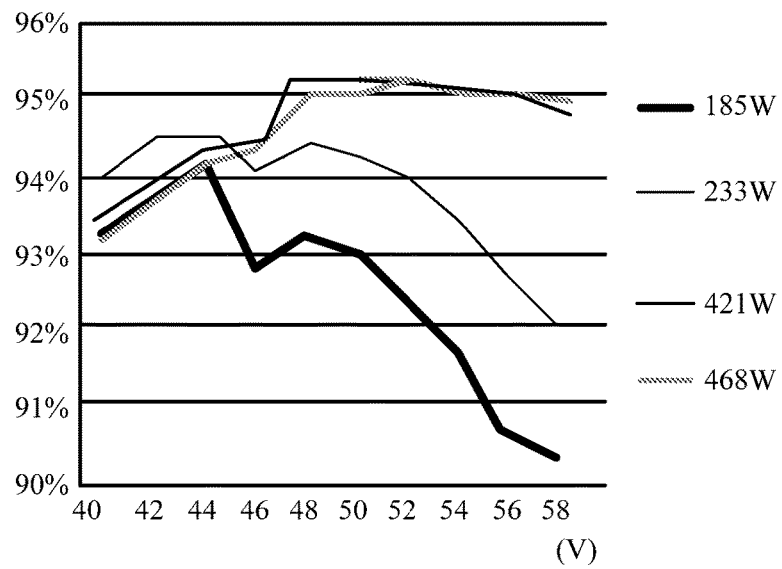
FIG. 6 is a diagram of correspondences between input voltages and energy efficiency of a type of secondary power supply at different load powers according to an embodiment of this application.

For a communications device, not only there is an energy loss in a primary power supply, but also there is an energy loss in a secondary power supply. Therefore, not only energy efficiency control on the primary power supply is required, but also energy efficiency control on the secondary power supply is required. Energy efficiency of a secondary power supply is related to an input voltage of the secondary power supply when a load power of the secondary power supply is fixed. FIG. 6 is a diagram of correspondences between input voltages and energy efficiency of a type of secondary power supply at different load powers according to an embodiment of this application. It can be seen from FIG. 6 that, at the different load powers, when the input voltages of the secondary power supply are within a specific interval, the energy efficiency of the secondary power supply is relatively high. Certainly, FIG. 6 shows only several correspondences between input voltages and energy efficiency at different powers. At any power, the power may be corresponding to a curve of a correspondence between an input voltage and energy efficiency of the secondary power supply. In addition, all correspondences between input voltages and energy efficiency of different types of secondary power supplies may be obtained through detection.

It can be seen from FIG. 1 to FIG. 4 that, an input voltage of a secondary power supply is related to an output voltage of a primary power supply. For example, reducing the output voltage of the primary power supply leads to a change in the input voltage of the secondary power supply, and when a load power of the secondary power supply is unchanged, and the input voltage of the secondary power supply changes, energy efficiency of the secondary power supply is inevitably affected. Conversely, if the input voltage of the secondary power supply changes and the load power of the secondary power supply is unchanged, a current of the secondary power supply is inevitably changed, and when the current of the secondary power supply changes, a current of the primary power supply is affected in turn, and a load rate of the primary power supply is also affected, thereby affecting energy efficiency of the primary power supply. Therefore, it can be learned that the energy efficiency of the primary power supply and the energy efficiency of the secondary power supply also affect each other. Therefore, overall energy efficiency of a communications device can be improved as far as possible through cooperative control of a primary power supply and a secondary power supply, so as to reduce an energy loss of the communications device.

Figure 7:
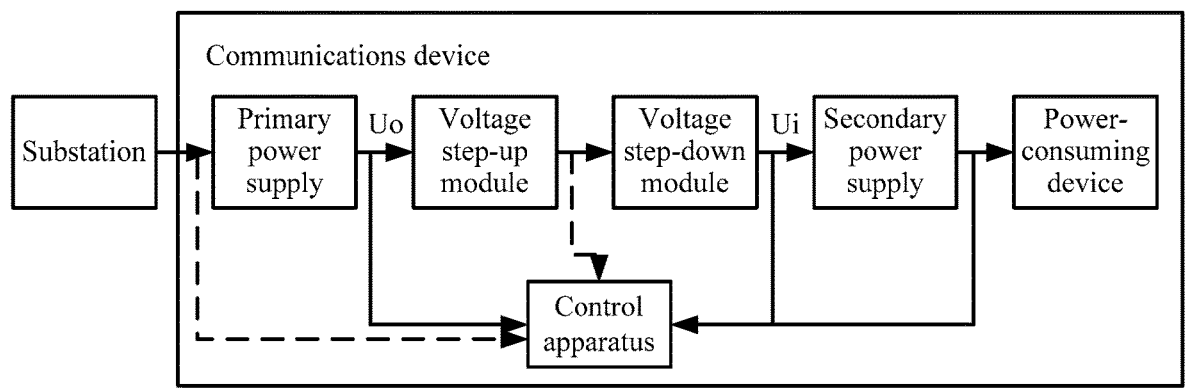
FIG. 7 is a schematic diagram of another structure example of a communications device according to an embodiment of this application.

FIG. 7 is a schematic diagram of another structure example of a communications device according to an embodiment of this application. It should be noted that, FIG. 7 is only a schematic structural diagram in which one secondary power supply is used as an example, and FIG. 7 should not be understood as a limitation on a quantity of secondary power supplies.

The communications device in FIG. 7 includes a primary power supply, a voltage step-up module, a voltage step-down module, the secondary power supply, a power-consuming device, and a control apparatus. The control apparatus may obtain information about the primary power supply, such as an output voltage of the primary power supply. Certainly, the control apparatus may also obtain an input voltage, an input current, an output current, an output power, and the like of the primary power supply. The control apparatus may further obtain an input voltage, a load power, and the like of the secondary power supply. Certainly, the control apparatus may also obtain information such as a voltage and a current of the voltage step-up module and a voltage and a current of the voltage step-down module. The control apparatus may calculate a load rate of the primary power supply by using obtained information such as voltages, currents, and power load of the primary power supply and the secondary power supply, so as to perform cooperative control of the primary power supply and the secondary power supply.

Figure 8:
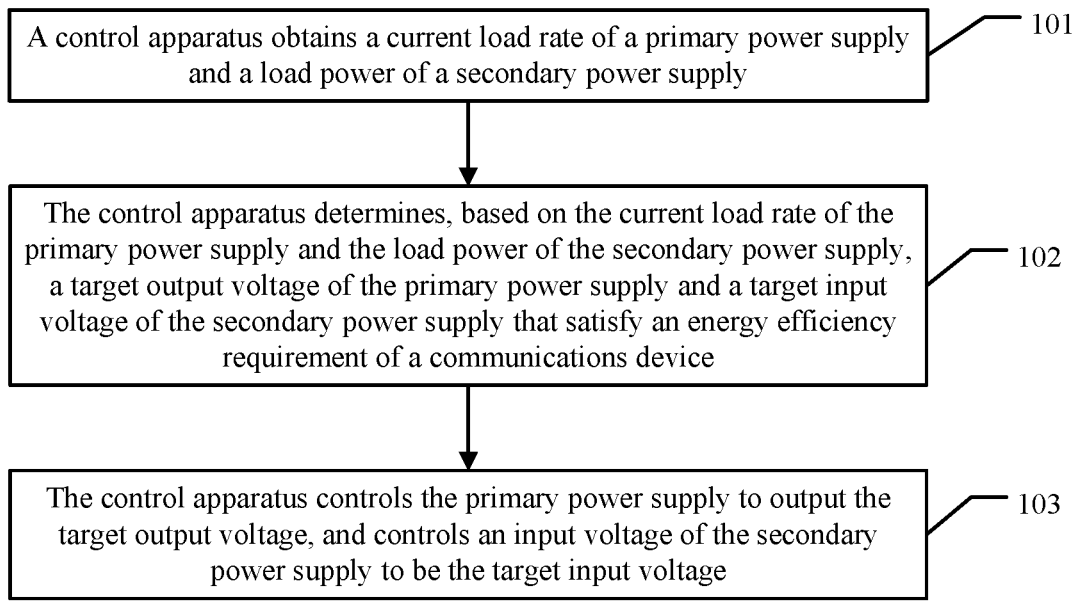
FIG. 8 is a schematic diagram of an embodiment of an energy efficiency control method according to an embodiment of this application.

Based on the structure of the communications device shown in FIG. 7 and with reference to FIG. 8, the following describes an energy efficiency control method provided in the embodiments of this application.

FIG. 8 is a schematic diagram of an embodiment of an energy efficiency control method according to an embodiment of this application.

As shown in FIG. 8, this embodiment of the energy efficiency control method provided in the embodiment of this application includes the following steps:

101. A control apparatus obtains a current load rate of a primary power supply and a load power of a secondary power supply, where energy efficiency of the primary power supply is related to the load rate of the primary power supply, and energy efficiency of the secondary power supply is related to the load power of the secondary power supply.

The energy efficiency of the primary power supply is related to the load rate of the primary power supply, and the energy efficiency of the secondary power supply is related to the load power of the secondary power supply.

The load rate of the primary power supply may be calculated based on a ratio of a load power to an output power or based on a load current and an output current. Certainly, the load rate of the primary power supply may alternatively be calculated based on load electricity consumption and an output electric quantity.

The current load rate is a load rate at a data collection moment or in a data collection cycle. A load power of a secondary power supply is usually constant.

102. The control apparatus determines, based on the current load rate of the primary power supply and the load power of the secondary power supply, a target output voltage of the primary power supply and a target input voltage of the secondary power supply that satisfy an energy efficiency requirement of a communications device.

Energy efficiency of the communications device is related to the energy efficiency of the primary power supply and the energy efficiency of the secondary power supply.

103. The control apparatus controls the primary power supply to output the target output voltage, and controls an input voltage of the secondary power supply to be the target input voltage.

In this embodiment of this application, an output voltage of the primary power supply and an input voltage of the secondary power supply can be controlled based on the current load rate of the primary power supply and the load power of the secondary power supply, so that both the primary power supply and the secondary power supply have relatively high energy efficiency, thereby reducing an energy loss of the communications device.

In this embodiment of this application, it can be learned from FIG. 5 that, when the load rate of the primary power supply is within a specific load rate interval, the energy efficiency of the primary power supply is relatively high. As shown in FIG. 5, when the load rate of this type of primary power supply is within 40% to 80%, all energy efficiency of the primary power supply is relatively high, and all the energy efficiency is 96% or higher. For the example in FIG. 5, a load rate interval 40% to 80% of the primary power supply may be set as a first load rate interval, and all the other intervals such as 0% to 40% or 80% to 100% each may be set as a second load rate interval.

It can be learned from FIG. 6 that, at a load power, when an input voltage of the secondary power supply is within a specific voltage interval, the energy efficiency of the secondary power supply is relatively high. As shown in FIG. 6, when the load power of this type of secondary power supply is 185 W, the energy efficiency is highest when the input voltage is 44 V, and all energy efficiency when the input voltage is between 42 V and 45 V is also relatively high. In this case, 42 V to 45 V may be set as a first voltage interval, and another interval such as 40 V to 42 V or 45 V to 58 V is set as a second voltage interval.

In this embodiment of this application, there may be a plurality of solutions for determining the target output voltage of the primary power supply and the target input voltage of the secondary power supply that satisfy the energy efficiency requirement of the communications device, and the following uses three of the solutions as examples for description in this embodiment of this application.

The three implementations are as follows:

In an implementation A, the load rate of the primary power supply is within a first load rate interval, and the input voltage of the secondary power supply is within a first voltage interval.

In an implementation B, the load rate of the primary power supply is within a first load rate interval, and the input voltage of the secondary power supply is not within a first voltage interval.

In an implementation C, the load rate of the primary power supply is not within a first load rate interval.

For the foregoing implementation A and implementation B, during the obtaining a current load rate of the primary power supply and a load power of the secondary power supply, the method may further include:

obtaining a current input voltage of the secondary power supply, where the energy efficiency of the secondary power supply is related to the input voltage of the secondary power supply at the load power, and the input voltage of the secondary power supply is related to an output voltage of the primary power supply.

The following separately provides description about the implementation A, the implementation B, and the implementation C.

Figure 9:
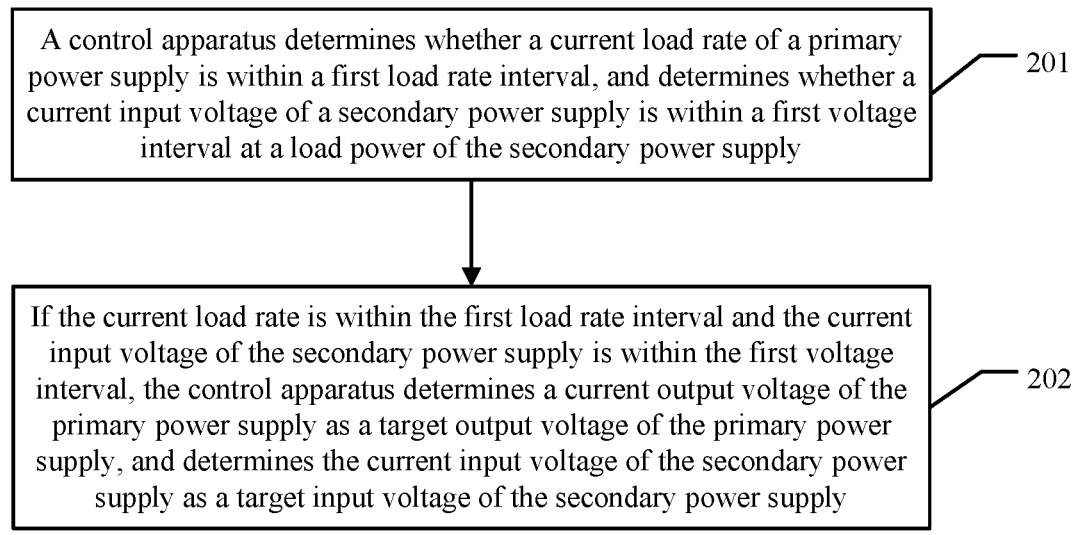
FIG. 9 is a schematic diagram of another embodiment of an energy efficiency control method according to an embodiment of this application.

Based on the implementation A, as shown in FIG. 9, another embodiment of the energy efficiency control method provided in the embodiment of this application may include the following steps:

201. The control apparatus determines whether the current load rate of the primary power supply is within a first load rate interval, and determines whether a current input voltage of the secondary power supply is within a first voltage interval at the load power of the secondary power supply.

Energy efficiency corresponding to the first load rate interval is higher than energy efficiency corresponding to a second load rate interval, and energy efficiency corresponding to the first voltage interval is higher than energy efficiency corresponding to a second voltage interval.

202. If the current load rate is within the first load rate interval and the current input voltage of the secondary power supply is within the first voltage interval, the control apparatus determines a current output voltage of the primary power supply as the target output voltage of the primary power supply, and determines the current input voltage of the secondary power supply as the target input voltage of the secondary power supply.

In the example provided in FIG. 5, the load rate interval 40% to 80% of the primary power supply is set as the first load rate interval, and all the other intervals such as 0% to 40% or 80% to 100% each may be set as the second load rate interval.

In the example provided in FIG. 6, when the load power of the secondary power supply is 185 W, 42V to 45V is set as the first voltage interval, and another interval such as 40 V to 42 V or 45 V to 58 V is set as the second voltage interval.

If the current load rate is 50% within the interval of 40% to 80%, if the load power of the secondary power supply is 185 W, the input voltage of the secondary power supply is 43 V, and 43 V is within 42 V to 45 V, it may be determined, based on the diagram of the correspondence between a load rate and energy efficiency of the primary power supply in FIG. 5 and the diagram of the correspondences between input voltages and energy efficiency of the secondary power supply in FIG. 6, that both the energy efficiency of the primary power supply and the energy efficiency of the secondary power supply are very high when the current load rate is 50% and the input voltage of the secondary power supply is 43 V and no adjustment is required. In this case, it may be determined that a current output voltage of the primary power supply is the target output voltage of the primary power supply and the current input voltage of the secondary power supply is the target input voltage of the secondary power supply.

Figure 10:
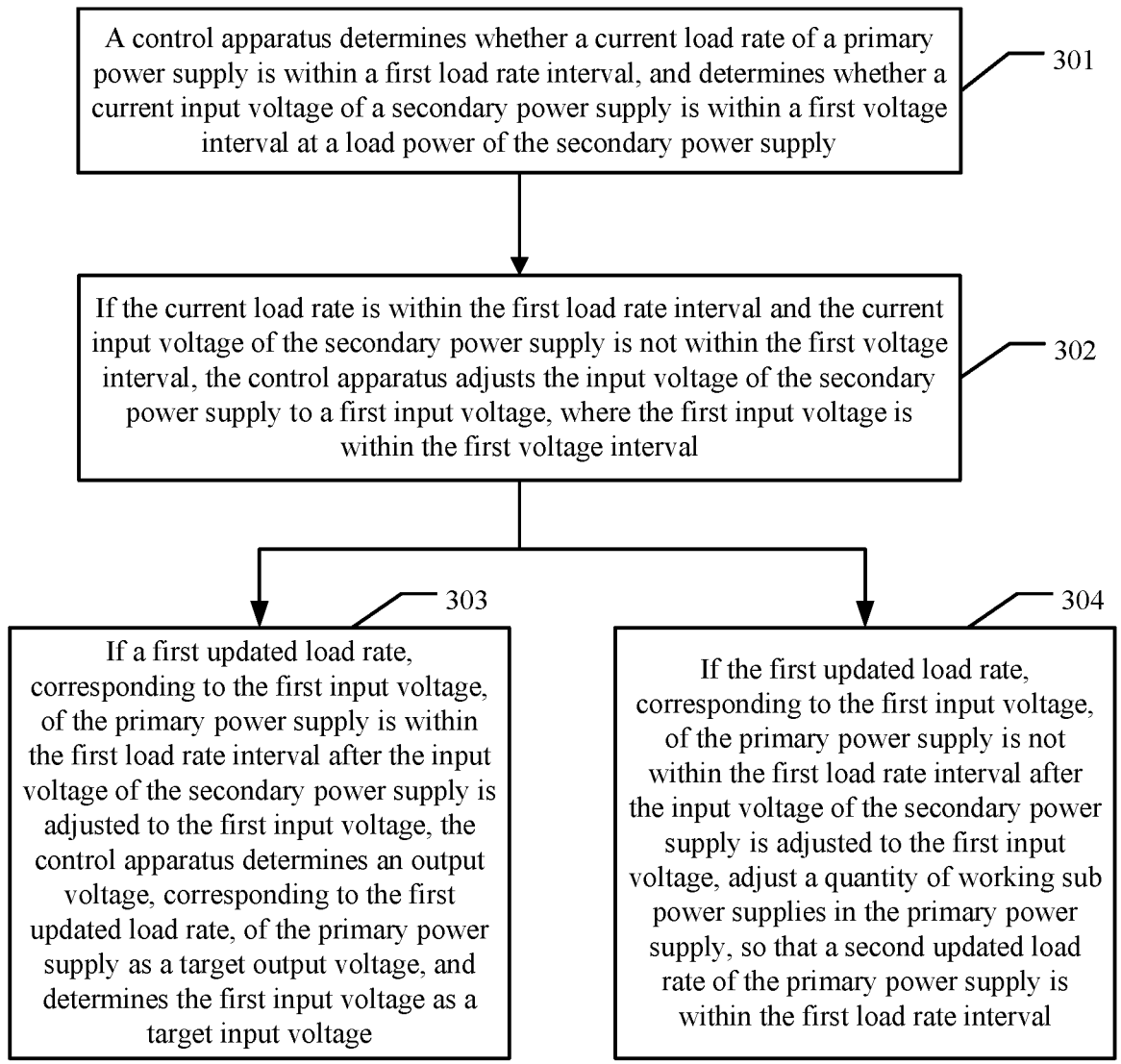
FIG. 10 is a schematic diagram of another embodiment of an energy efficiency control method according to an embodiment of this application.

Based on the implementation B, as shown in FIG. 10, another embodiment of the energy efficiency control method provided in the embodiment of this application may include the following steps:

301. The control apparatus determines whether the current load rate of the primary power supply is within a first load rate interval, and determines whether a current input voltage of the secondary power supply is within a first voltage interval at the load power of the secondary power supply.

Energy efficiency corresponding to the first load rate interval is higher than energy efficiency corresponding to a second load rate interval, and energy efficiency corresponding to the first voltage interval is higher than energy efficiency corresponding to a second voltage interval.

302. If the current load rate is within the first load rate interval and the current input voltage of the secondary power supply is not within the first voltage interval, the control apparatus adjusts the input voltage of the secondary power supply to a first input voltage, where the first input voltage is within the first voltage interval.

In the example provided in FIG. 5, the load rate interval 40% to 80% of the primary power supply is set as the first load rate interval, and all the other intervals such as 0% to 40% or 80% to 100% each may be set as the second load rate interval.

In the example provided in FIG. 6, when the load power of the secondary power supply is 185 W, 42 V to 45 V is set as the first voltage interval, and another interval such as 40 V to 42 V or 45 V to 58 V is set as the second voltage interval.

If the current load rate is 50% within the interval of 40% to 80%, if the load power of the secondary power supply is 185 W, the input voltage of the secondary power supply is 41V, and 41 V is not within 42 V to 45 V, because the current input voltage of the secondary power supply is not within the first voltage interval, the control apparatus adjusts the input voltage of the secondary power supply to a first input voltage, for example, adjusts the input voltage of the secondary power supply to 42.5 V, and it indicates that the first input voltage is 42.5 V. There are many methods for adjusting the secondary power supply, for example, adjusting the input voltage of the secondary power supply by adjusting resistance.

303. If a first updated load rate, corresponding to the first input voltage, of the primary power supply is within the first load rate interval after the input voltage of the secondary power supply is adjusted to the first input voltage, the control apparatus determines an output voltage, corresponding to the first updated load rate, of the primary power supply as the target output voltage, and determines the first input voltage as the target input voltage.

After the input voltage of the secondary power supply is adjusted to 42.5 V, the load rate of the primary power supply is affected to some extent, and a changed load rate of the primary power supply is referred to as a first updated load rate. If the first updated load rate is 52%, and 52% is still within the interval of 40% to 80%, it may be determined that an output voltage, corresponding to the first updated load rate 52%, of the primary power supply is the target output voltage, and the adjusted first input voltage 42.5 V of the secondary power supply is the target input voltage.

304. If the first updated load rate, corresponding to the first input voltage, of the primary power supply is not within the first load rate interval after the input voltage of the secondary power supply is adjusted to the first input voltage, the control apparatus adjusts a quantity of working sub power supplies in the primary power supply, so that a second updated load rate of the primary power supply is within the first load rate interval.

After the input voltage of the secondary power supply is adjusted to 42.5 V, the load rate of the primary power supply is affected to some extent, and a changed load rate of the primary power supply is referred to as a first updated load rate. If the first updated load rate is 90%, and 90% is not within the interval of 40% to 80%, a quantity of working sub power supplies in the primary power supply needs to be adjusted.

It can be understood that, there may be a plurality of sub power supplies in the primary power supply, and each sub power supply has a control switch. If the first updated load rate is 90%, it indicates that the current load rate of the primary power supply is increased and there are a relatively small quantity of sub power supplies in an operation state currently, and in this case, the quantity of working sub power supplies needs to be increased. The working sub power supply is a sub power supply in the operation state. If the first updated load rate is 30%, it indicates that the current load rate of the primary power supply is decreased and there are a relatively large quantity of sub power supplies in an operation state currently, and in this case, the quantity of working sub power supplies needs to be decreased.

An objective of working sub power supply adjustment is to make a second updated load rate, obtained after the adjustment, of the primary power supply be within the first load rate interval.

Certainly, after the load rate of the primary power supply is adjusted to the second updated load rate, the input voltage of the secondary power supply changes, and then the input voltage of the secondary power supply needs to be adjusted. This process may be a process in which adjustment may be performed once to make the load rate of the primary power supply fall within the first load rate interval and make the input voltage of the secondary power supply fall within the first voltage interval, but may alternatively be a process of performing adjustment for a plurality of times until the load rate of the primary power supply falls within the first load rate interval and the input voltage of the secondary power supply falls within the first voltage interval.

In the foregoing implementation A and implementation B, not only a current load rate of the primary power supply needs to be determined, but also a current input voltage of the secondary power supply needs to be determined. In the following implementation C, only a current load rate of the primary power supply needs to be determined. When the current load rate is not within the first load rate interval, a quantity of working sub power supplies of the primary power supply needs to be adjusted. Adjusting the load rate of the primary power supply inevitably leads to a change of the input voltage of the secondary power supply, and therefore it is meaningless to further obtain a current input voltage of the secondary power supply. Therefore, in the implementation C, only a current load rate of the primary power supply needs to be obtained first.

Figure 11:
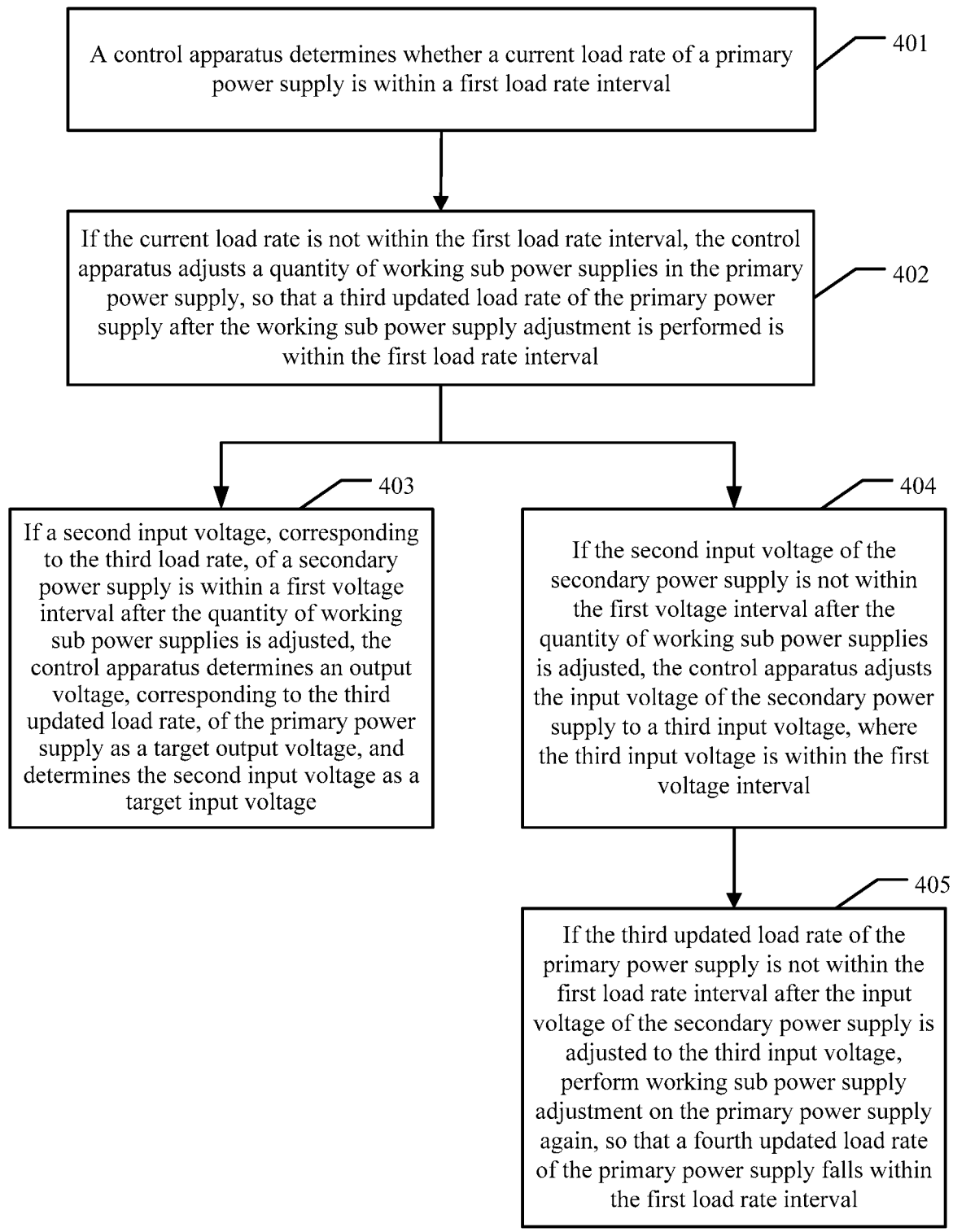
FIG. 11 is a schematic diagram of another embodiment of an energy efficiency control method according to an embodiment of this application.

In the implementation C, as shown in FIG. 11, another embodiment of the energy efficiency control method provided in the embodiment of this application includes the following steps:

401. The control apparatus determines whether the current load rate of the primary power supply is within a first load rate interval, where energy efficiency corresponding to the first load rate interval is higher than energy efficiency corresponding to a second load rate interval.

402. If the current load rate is not within the first load rate interval, the control apparatus adjusts a quantity of working sub power supplies in the primary power supply, so that a third updated load rate of the primary power supply after the working sub power supply adjustment is performed is within the first load rate interval.

There are two manners of adjusting the quantity of working sub power supplies, and one manner is increasing the quantity of working sub power supplies and the other manner is decreasing the quantity of working sub power supplies.

If the current load rate is greater than a maximum value of the first load rate interval, the control apparatus increases the quantity of working sub power supplies in the primary power supply, so that a third load rate of the primary power supply after the adjustment is performed falls within the first load rate interval.

If the current load rate is less than a minimum value of the first load rate interval, the control apparatus decreases the quantity of working sub power supplies in the primary power supply, so that a third load rate of the primary power supply after the adjustment is performed falls within the first load rate interval.

403. If a second input voltage, corresponding to the third load rate, of the secondary power supply is within a first voltage interval after the quantity of working sub power supplies is adjusted, the control apparatus determines an output voltage, corresponding to the third updated load rate, of the primary power supply as the target output voltage, and determines the second input voltage as the target input voltage, where energy efficiency corresponding to the first voltage interval is higher than energy efficiency corresponding to a second voltage interval.

After the quantity of working sub power supplies is adjusted, a load rate of the primary power supply is referred to as a third load rate, and an output voltage, corresponding to the third load rate, of the secondary power supply is referred to as a second input voltage. After the load rate of the primary power supply is adjusted, it is determined whether the second input voltage is within the first voltage interval. If the second input voltage is within the first voltage interval, repeated adjustment is not required, and an output voltage, corresponding to the third load rate, of the primary power supply may be determined as the target output voltage, and the second input voltage of the secondary power supply may be determined as the target input voltage.

404. If the second input voltage of the secondary power supply is not within the first voltage interval after the quantity of working sub power supplies is adjusted, the control apparatus adjusts the input voltage of the secondary power supply to a third input voltage, where the third input voltage is within the first voltage interval.

If the third updated load rate of the primary power supply is still within the first load rate interval after the input voltage of the secondary power supply is adjusted to the third input voltage, the control apparatus determines an output voltage corresponding to the third updated load rate as the target output voltage, and determines the third input voltage as the target input voltage.

If the second input voltage is not within the first voltage interval, the input voltage of the secondary power supply further needs to be adjusted. An adjustment manner may be adjusting resistance to change the input voltage of the secondary power supply. An adjusted input voltage of the secondary power supply is referred to as a third input voltage.

405. If the third updated load rate of the primary power supply is not within the first load rate interval after the input voltage of the secondary power supply is adjusted to the third input voltage, perform working sub power supply adjustment on the primary power supply again, so that a fourth updated load rate of the primary power supply after the adjustment is performed falls within the first load rate interval.

Certainly, after the input voltage of the secondary power supply is adjusted to the third input voltage, a corresponding load rate of the primary power supply changes, and a load rate, having changed along with the third input voltage, of the primary power supply is referred to as a third updated load rate. If the third updated load rate falls within the first load rate interval, an output voltage, corresponding to the third updated load rate, of the primary power supply may be determined as the target output voltage, and the third input voltage is determined as the target input voltage.

If the third updated load rate is not within the first load rate interval, working sub power supply adjustment is performed on the primary power supply again, and the load rate of the primary power supply is adjusted to the fourth updated load rate. Certainly, after the load rate of the primary power supply is adjusted to the fourth updated load rate, the input voltage of the secondary power supply changes. If a changed input voltage of the secondary power supply is within the first voltage interval, adjustment does not need to be performed repeatedly. If the changed input voltage of the secondary power supply is not within the first voltage interval, a repeated process further needs to be performed according to step 404 and step 405 until the load rate of the primary power supply falls within the first load rat interval and the input voltage of the secondary power supply falls within the first voltage interval.

In addition, in addition to the foregoing several manners described above: the implementations A, B, and C, the method further includes:

determining, by the control apparatus according to a calculation function and based on the current load rate of the primary power supply, the load power of the secondary power supply, and the current input voltage of the secondary power supply, a target output voltage of the primary power supply and a target input voltage of the secondary power supply that are corresponding to best energy efficiency of the communications device.

In this embodiment of this application, alternatively, calculation may be performed by using a function in which a load rate of the primary power supply, an output voltage of the primary power supply, and an input voltage of the secondary power supply are used as independent variables, a load power of the secondary power supply is used as a reference factor, and comprehensive energy efficiency is used as a dependent variable; and when a comprehensive energy efficiency value is a maximum value, an output voltage of the primary power supply and an input voltage of the secondary power supply are determined.

The comprehensive energy efficiency is energy efficiency of an entire line formed by the primary power supply and the secondary power supply.

Certainly, the foregoing embodiments only describe cases of the primary power supply and the secondary power supply. Actually, a voltage step-up module and a voltage step-down module between the primary power supply and the secondary power supply may also be controlled by the control apparatus, so as to ensure best comprehensive energy efficiency of the entire line.

The foregoing describes the structures of the communications devices and the energy efficiency control method with reference to the accompanying drawings, and the following describes control apparatuses in the embodiments of this application with reference to accompanying drawings.

Figure 12:
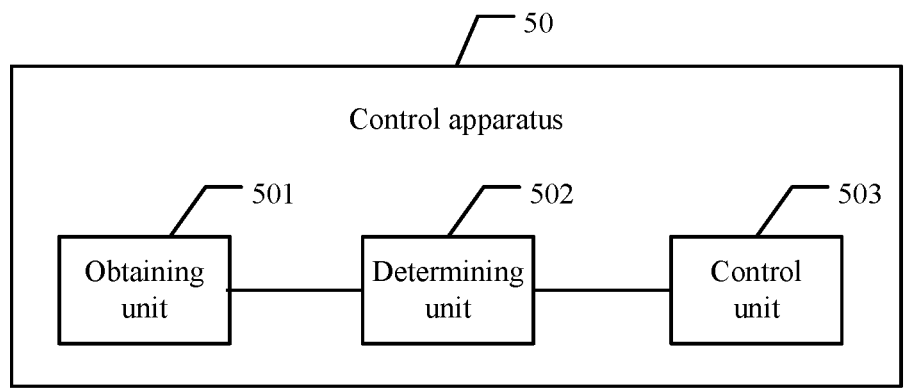
FIG. 12 is a schematic diagram of an embodiment of a control apparatus according to an embodiment of this application.

FIG. 12 shows an embodiment of a control apparatus 50 according to an embodiment of this application. The control apparatus is applied to a communications device; the communications device further includes a primary power supply and a secondary power supply; and the control apparatus 50 includes:

an obtaining unit 501, configured to obtain a current load rate of the primary power supply and a load power of the secondary power supply, where energy efficiency of the primary power supply is related to the load rate of the primary power supply, and energy efficiency of the secondary power supply is related to the load power of the secondary power supply;

a determining unit 502, configured to determine, based on the current load rate of the primary power supply and the load power of the secondary power supply that are obtained by the obtaining unit 501, a target output voltage of the primary power supply and a target output voltage of the secondary power supply that satisfy an energy efficiency requirement of the communications device; and a control unit 503, configured to control the primary power supply to output the target output voltage determined by the determining unit 502, and control an input voltage of the secondary power supply to be the target input voltage.

In this embodiment of this application, an output voltage of the primary power supply and an input voltage of the secondary power supply can be controlled based on the current load rate of the primary power supply and the load power of the secondary power supply, so that both the primary power supply and the secondary power supply have relatively high energy efficiency, thereby reducing an energy loss of the communications device.

Optionally, the obtaining unit 501 is further configured to obtain a current input voltage of the secondary power supply, where the energy efficiency of the secondary power supply is related to the input voltage of the secondary power supply at the load power, and the input voltage of the secondary power supply is related to an output voltage of the primary power supply.

The determining unit 502 is configured to:

determine whether the current load rate of the primary power supply is within a first load rate interval, and determine whether the current input voltage of the secondary power supply is within a first voltage interval at the load power of the secondary power supply, where energy efficiency corresponding to the first load rate interval is higher than energy efficiency corresponding to a second load rate interval, and energy efficiency corresponding to the first voltage interval is higher than energy efficiency corresponding to a second voltage interval; and if the current load rate is within the first load rate interval and the current input voltage of the secondary power supply is within the first voltage interval, determine a current output voltage of the primary power supply as the target output voltage of the primary power supply, and determine the current input voltage of the secondary power supply as the target input voltage of the secondary power supply.

Optionally, the determining unit 502 is further configured to:

if the current load rate is within the first load rate interval and the current input voltage of the secondary power supply is not within the first voltage interval, adjust the input voltage of the secondary power supply to a first input voltage, where the first input voltage is within the first voltage interval; and if a first updated load rate, corresponding to the first input voltage, of the primary power supply is within the first load rate interval after the input voltage of the secondary power supply is adjusted to the first input voltage, determine an output voltage, corresponding to the first updated load rate, of the primary power supply as the target output voltage, and determine the first input voltage as the target input voltage.

Optionally, the determining unit 502 is further configured to: if the first updated load rate, corresponding to the first input voltage, of the primary power supply is not within the first load rate interval after the input voltage of the secondary power supply is adjusted to the first input voltage, adjust a quantity of working sub power supplies in the primary power supply, so that a second updated load rate of the primary power supply is within the first load rate interval.

Optionally, the determining unit 502 is configured to:

determine whether the current load rate of the primary power supply is within the first load rate interval, where the energy efficiency corresponding to the first load rate interval is higher than the energy efficiency corresponding to the second load rate interval;

if the current load rate is not within the first load rate interval, adjust a quantity of working sub power supplies in the primary power supply, so that a third updated load rate of the primary power supply after the working sub power supply adjustment is performed is within the first load rate interval; and if a second input voltage, corresponding to the third load rate, of the secondary power supply is within the first voltage interval after the quantity of working sub power supplies is adjusted, determine an output voltage, corresponding to the third updated load rate, of the primary power supply as the target output voltage, and determine the second input voltage as the target input voltage, where the energy efficiency corresponding to the first voltage interval is higher than the energy efficiency corresponding to the second voltage interval.

Optionally, the determining unit 502 is configured to:

if the current load rate is greater than a maximum value of the first load rate interval, increase, for the control apparatus, the quantity of working sub power supplies in the primary power supply, so that a third load rate of the primary power supply after the adjustment is performed falls within the first load rate interval.

Optionally, the determining unit 502 is configured to:

if the current load rate is less than a minimum value of the first load rate interval, decrease, for the control apparatus, the quantity of working sub power supplies in the primary power supply, so that a third load rate of the primary power supply after the adjustment is performed falls within the first load rate interval.

Optionally, the determining unit 502 is further configured to:

if the second input voltage of the secondary power supply is not within the first voltage interval after the quantity of working sub power supplies is adjusted, adjust the input voltage of the secondary power supply to a third input voltage, where the third input voltage is within the first voltage interval; and if the third updated load rate of the primary power supply is still within the first load rate interval after the input voltage of the secondary power supply is adjusted to the third input voltage, determine an output voltage corresponding to the third updated load rate as the target output voltage, and determine the third input voltage as the target input voltage.

Optionally, the determining unit 502 is further configured to: if the third updated load rate of the primary power supply is not within the first load rate interval after the input voltage of the secondary power supply is adjusted to the third input voltage, perform working sub power supply adjustment on the primary power supply again, so that a fourth updated load rate of the primary power supply after the adjustment is performed falls within the first load rate interval.

Optionally, the determining unit 502 is further configured to: determine, according to a calculation function and based on the current load rate of the primary power supply, the load power of the secondary power supply, and the current input voltage of the secondary power supply, a target output voltage of the primary power supply and a target input voltage of the secondary power supply that are corresponding to best energy efficiency of the communications device.

The foregoing describes, mainly from a perspective of the control apparatus, the solution provided in the embodiments of this application. It can be understood that, to implement the foregoing functions, the foregoing control apparatus includes a corresponding hardware structure and/or software module for performing the functions. A person of ordinary skill in the art should easily be aware that, in combination with the examples described in the embodiments disclosed in this specification, modules and algorithms steps may be implemented by hardware or a combination of hardware and computer software. Whether a function is performed by hardware or hardware driven by computer software depends on particular applications and preset design conditions of the technical solutions. A person skilled in the art may use different methods to implement the described functions for each particular application, but it should not be considered that the implementation goes beyond the scope of this application.

In terms of a hardware structure, the control apparatus may be implemented by a physical device or jointly implemented by a plurality of physical devices, or the control apparatus may be a logical function module inside a physical device. This is not specifically limited in this embodiment of the application.

Figure 13:
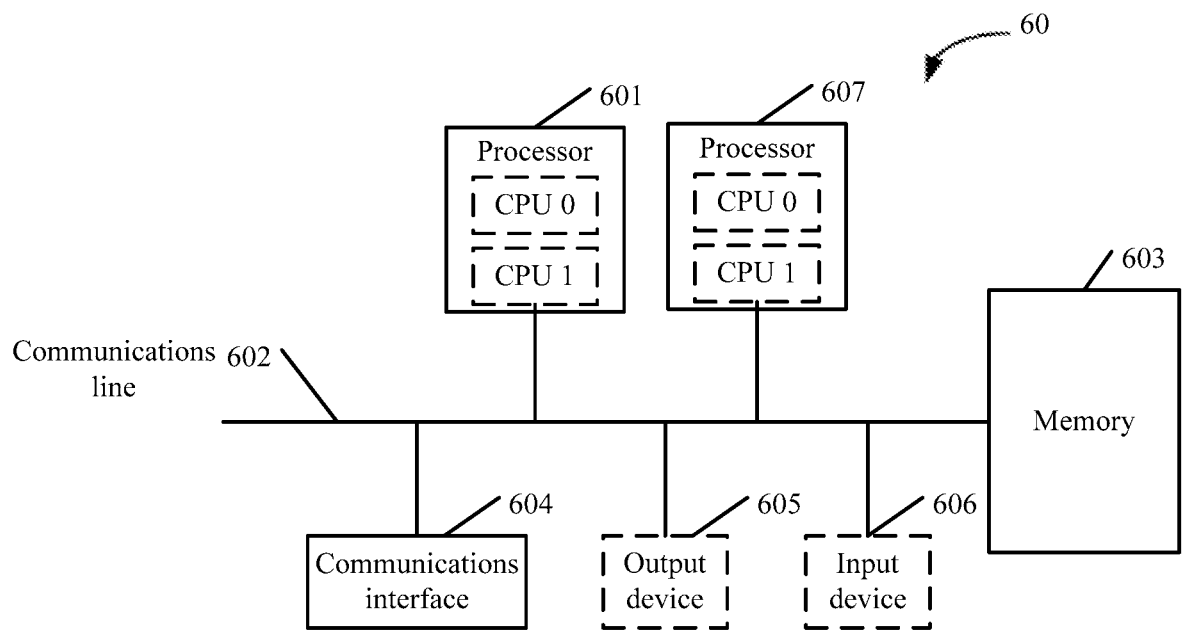
FIG. 13 is a schematic diagram of another embodiment of a control apparatus according to an embodiment of this application.

For example, the control apparatus may be implemented by a hardware structure in FIG. 13. FIG. 13 is a schematic diagram of the hardware structure of the control apparatus according to an embodiment of this application. The control apparatus 60 includes at least one processor 601, a communications line 602, a memory 603, and at least one communications interface 604.

The processor 601 may be a general-purpose central processing unit (CPU), a microprocessor, an application-specific integrated circuit (ASIC), or one or more integrated circuits configured to control program execution of the solution of this application.

The communications line 602 may include a channel for transmitting information between the foregoing components.

The communications interface 604 is configured to communicate with another device or a communications network such as an Ethernet, a radio access network (RAN), or a wireless local area network (WLAN) by using any apparatus such as a transceiver.

The memory 603 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, or the like), a magnetic disk storage medium, or another magnetic storage device, or any other medium that can be used to carry or store expected program code in a form of an instruction or a data structure and that can be accessed by a computer, but no limitation is set thereto. The memory may exist independently, and is connected to the processor by using the communications line 602. Alternatively, the memory may be integrated with the processor.

The memory 603 is configured to store a computer execution instruction for performing the solution of this application, and the processor 601 controls execution of the computer execution instruction. The processor 601 is configured to execute the computer execution instruction stored in the memory 603, so as to implement the policy control method provided in the following embodiments of this application.

Optionally, the computer execution instruction in this embodiment of this application may also be referred to as application code. This is not specifically limited in this embodiment of the application.

In specific implementation, in an embodiment, the processor 601 may include one or more CPUs, such as a CPU 0 and a CPU 1 in FIG. 13.

In specific implementation, in an embodiment, the control apparatus 60 may include a plurality of processors, such as the processor 601 and a processor 607 in FIG. 13. Each of these processors may be a single-core (single-CPU) processor, or may be a multi-core (multi-CPU) processor. The processor herein may be one or more devices, circuits, and/or processing cores used to process data (for example, a computer program instruction).

In specific implementation, in an embodiment, the control apparatus 60 may further include an output device 605 and an input device 606. The output device 605 communicates with the processor 601, and may display information in a plurality of manners. For example, the output device 605 may be a liquid crystal display (LCD), a light emitting diode (LED) display device, a cathode ray tube (CRT) display device, a projector, or the like. The input device 606 communicates with the processor 601, and may receive input of a user in a plurality of manners. For example, the input device 606 may be a mouse, a keyboard, a touchscreen device, or a sensor device.

The foregoing control apparatus 60 may be a general-purpose device or a special-purpose device. In specific implementation, the control apparatus 60 may be a desktop computer, a portable computer, a network server, a personal digital assistant (PDA), a mobile phone, a tablet computer, a wireless terminal device, a built-in device, or a device having a structure similar to that in FIG. 13. A type of the control apparatus 60 is not limited in this embodiment of this application.

In the embodiments of this application, function module division may be performed on an executive function network element based on the foregoing method examples. For example, function modules may be obtained through division based on corresponding functions, or two or more functions may be integrated into a processor module. The integrated module may be implemented in a form of hardware, or may be implemented in a form of a software functional module. It should be noted that, in the embodiments of this application, module division is an example, and is merely a logical function division. In actual implementation, another division manner may be used.

All or some of the foregoing embodiments may be implemented by software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc, or the like.

The foregoing describes in detail the energy efficiency control method, the control apparatus, the communications device provided in the embodiments of this application. Specific examples are used in this specification to explain a principle and implementations of this application. The foregoing description of the embodiments is only used to help understand the method and a core idea of this application. In addition, according to the concept of this application, a person of ordinary skill in the art can make modification based on a specific implementation and an application range. In conclusion, content of this specification cannot be understood as a limitation on this application.

What is claimed is:

1. An energy efficiency control method, wherein the method is applied to a communications device; the communications device comprises a primary power supply, a secondary power supply, and a control apparatus; and the method comprises:

obtaining, by the control apparatus, a current load rate of the primary power supply and a load power of the secondary power supply, wherein energy efficiency of the primary power supply is related to the current load rate of the primary power supply, and energy efficiency of the secondary power supply is related to the load power of the secondary power supply;

determining, by the control apparatus based on the current load rate of the primary power supply and the load power of the secondary power supply, a target output voltage of the primary power supply and a target input voltage of the secondary power supply that satisfy an energy efficiency requirement of the communications device, wherein energy efficiency of the communications device is related to the energy efficiency of the primary power supply and the energy efficiency of the secondary power supply; and controlling, by the control apparatus, the primary power supply to output the target output voltage, and controlling an input voltage of the secondary power supply to be the target input voltage.

2. The method according to claim 1, wherein during the obtaining the current load rate of the primary power supply and the load power of the secondary power supply, the method further comprises:

obtaining, by the control apparatus, a current input voltage of the secondary power supply, wherein the energy efficiency of the secondary power supply is related to the input voltage of the secondary power supply at the load power, and the input voltage of the secondary power supply is related to an output voltage of the primary power supply.

3. The method according to claim 2, wherein the determining, by the control apparatus based on the current load rate of the primary power supply and the load power of the secondary power supply, the target output voltage of the primary power supply and the target input voltage of the secondary power supply that satisfy the energy efficiency requirement of the communications device comprises:

determining, by the control apparatus, whether the current load rate of the primary power supply is within a first load rate interval, and determining whether the current input voltage of the secondary power supply is within a first voltage interval at the load power of the secondary power supply, wherein energy efficiency corresponding to the first load rate interval is higher than energy efficiency corresponding to a second load rate interval, and energy efficiency corresponding to the first voltage interval is higher than energy efficiency corresponding to a second voltage interval; and in response to the current load rate being within the first load rate interval and the current input voltage of the secondary power supply being within the first voltage interval, determining, by the control apparatus, a current output voltage of the primary power supply as the target output voltage of the primary power supply, and determining the current input voltage of the secondary power supply as the target input voltage of the secondary power supply.

4. The method according to claim 3, further comprising:
in response to the current load rate being within the first load rate interval and the current input voltage of the secondary power supply being not within the first voltage interval, adjusting, by the control apparatus, the input voltage of the secondary power supply to a first input voltage, wherein the first input voltage is within the first voltage interval; and in response to a first updated load rate, corresponding to the first input voltage, of the primary power supply being within the first load rate interval after the input voltage of the secondary power supply is adjusted to the first input voltage, determining, by the control apparatus, an output voltage, corresponding to the first updated load rate, of the primary power supply as the target output voltage, and determining the first input voltage as the target input voltage.

5. The method according to claim 4, further comprising:
in response to the first updated load rate, corresponding to the first input voltage, of the primary power supply being not within the first load rate interval after the input voltage of the secondary power supply is adjusted to the first input voltage, adjusting a quantity of working sub power supplies in the primary power supply, so that a second updated load rate of the primary power supply is within the first load rate interval.

6. The method according to claim 3, wherein the determining, by the control apparatus based on the current load rate of the primary power supply and the load power of the secondary power supply, the target output voltage of the primary power supply and the target input voltage of the secondary power supply that satisfy the energy efficiency requirement of the communications device comprises:

determining, by the control apparatus, whether the current load rate of the primary power supply is within the first load rate interval, wherein the energy efficiency corresponding to the first load rate interval is higher than the energy efficiency corresponding to the second load rate interval;

in response to the current load rate being not within the first load rate interval, adjusting, by the control apparatus, a quantity of working sub power supplies in the primary power supply, so that a third updated load rate of the primary power supply after the working sub power supply adjustment is performed is within the first load rate interval.

7. The method according to claim 6, wherein
in response to a second input voltage, corresponding to the third load rate, of the secondary power supply being within the first voltage interval after the quantity of working sub power supplies is adjusted, determining, by the control apparatus, an output voltage, corresponding to the third updated load rate, of the primary power supply as the target output voltage, and determining the second input voltage as the target input voltage, wherein the energy efficiency corresponding to the first voltage interval is higher than the energy efficiency corresponding to the second voltage interval.

8. The method according to claim 7, wherein the adjusting, by the control apparatus, the quantity of working sub power supplies in the primary power supply, comprises:

in response to the current load rate being greater than a maximum value of the first load rate interval, increasing, by the control apparatus, the quantity of working sub power supplies in the primary power supply, so that a third load rate of the primary power supply after the adjustment is performed falls within the first load rate interval.

9. The method according to claim 7, wherein the adjusting, by the control apparatus, the quantity of working sub power supplies in the primary power supply, comprises:

in response to the current load rate being less than a minimum value of the first load rate interval, decreasing, by the control apparatus, the quantity of working sub power supplies in the primary power supply, so that a third load rate of the primary power supply after the adjustment is performed falls within the first load rate interval.

10. The method according to claim 7, further comprising:
in response to the second input voltage of the secondary power supply being not within the first voltage interval after the quantity of working sub power supplies is adjusted, adjusting, by the control apparatus, the input voltage of the secondary power supply to a third input voltage, wherein the third input voltage is within the first voltage interval; and
in response to the third updated load rate of the primary power supply being still within the first load rate interval after the input voltage of the secondary power supply is adjusted to the third input voltage, determining, by the control apparatus, an output voltage corresponding to the third updated load rate as the target output voltage, and determining the third input voltage as the target input voltage.

11. The method according to claim 10, further comprising:
in response to the third updated load rate of the primary power supply being not within the first load rate interval after the input voltage of the secondary power supply is adjusted to the third input voltage, performing working sub power supply adjustment on the primary power supply again, so that a fourth updated load rate of the primary power supply after the adjustment is performed falls within the first load rate interval.

12. The method according to claim 3, further comprising:
determining, by the control apparatus according to a calculation function and based on the current load rate of the primary power supply, the load power of the secondary power supply, and the current input voltage of the secondary power supply, a target output voltage of the primary power supply and a target input voltage of the secondary power supply that are corresponding to best energy efficiency of the communications device.

13. A control apparatus, wherein the control apparatus is included in a communications device; the communication device further comprises a primary power supply and a secondary power supply; and the control apparatus comprises:
a processor; and
a memory coupled to the processor and having processor-executable instructions stored thereon, which when executed by the processor cause the control apparatus to:
obtain a current load rate of the primary power supply and a load power of the secondary power supply, wherein energy efficiency of the primary power supply is related to the current load rate of the primary power supply, and energy efficiency of the secondary power supply is related to the load power of the secondary power supply;
determine, based on the current load rate of the primary power supply and the load power of the secondary power supply that are obtained by the obtaining unit, a target output voltage of the primary power supply and a target input voltage of the secondary power supply that satisfy an energy efficiency requirement of the communications device, wherein energy efficiency of the communications device is related to the energy efficiency of the primary power supply and the energy efficiency of the secondary power supply; and
control the primary power supply to output the target output voltage determined by the determining unit, and control an input voltage of the secondary power supply to be the target input voltage.

14. The control apparatus according to claim 13, wherein the instructions further cause the control apparatus to:
obtain a current input voltage of the secondary power supply, wherein the energy efficiency of the secondary power supply is related to the input voltage of the secondary power supply at the load power, and the input voltage of the secondary power supply is related to an output voltage of the primary power supply; and
determine whether the current load rate of the primary power supply is within a first load rate interval, and determine whether the current input voltage of the secondary power supply is within a first voltage interval at the load power of the secondary power supply, wherein energy efficiency corresponding to the first load rate interval is higher than energy efficiency corresponding to a second load rate interval, and energy efficiency corresponding to the first voltage interval is higher than energy efficiency corresponding to a second voltage interval; and
in response to the current load rate being within the first load rate interval and the current input voltage of the secondary power supply being within the first voltage interval, determine a current output voltage of the primary power supply as the target output voltage of the primary power supply, and determine the current input voltage of the secondary power supply as the target input voltage of the secondary power supply.

15. The control apparatus according to claim 14, wherein the instructions further cause the control apparatus to:
in response to the current load rate being within the first load rate interval and the current input voltage of the secondary power supply being not within the first voltage interval, adjust the input voltage of the secondary power supply to a first input voltage, wherein the first input voltage is within the first voltage interval; and
in response to a first updated load rate, corresponding to the first input voltage, of the primary power supply being within the first load rate interval after the input voltage of the secondary power supply is adjusted to the first input voltage, determine an output voltage, corresponding to the first updated load rate, of the primary power supply as the target output voltage, and determine the first input voltage as the target input voltage.

16. The control apparatus according to claim 14, wherein the instructions further cause the control apparatus to:
determine whether the current load rate of the primary power supply is within the first load rate interval, wherein the energy efficiency corresponding to the first load rate interval is higher than the energy efficiency corresponding to the second load rate interval;
in response to the current load rate being not within the first load rate interval, adjust a quantity of working sub power supplies in the primary power supply, so that a third updated load rate of the primary power supply after the working sub power supply adjustment is performed is within the first load rate interval; and
in response to a second input voltage, corresponding to the third load rate, of the secondary power supply being within the first voltage interval after the quantity of working sub power supplies is adjusted, determine an output voltage, corresponding to the third updated load rate, of the primary power supply as the target output voltage, and determine the second input voltage as the target input voltage, wherein the energy efficiency corresponding to the first voltage interval is higher than the energy efficiency corresponding to the second voltage interval.

17. The control apparatus according to claim 16, wherein the instructions further cause the control apparatus to:

in response to the second input voltage of the secondary power supply being not within the first voltage interval after the quantity of working sub power supplies is adjusted, adjust the input voltage of the secondary power supply to a third input voltage, wherein the third input voltage is within the first voltage interval; and in response to the third updated load rate of the primary power supply being still within the first load rate interval after the input voltage of the secondary power supply is adjusted to the third input voltage, determine an output voltage corresponding to the third updated load rate as the target output voltage, and determine the third input voltage as the target input voltage.

18. The control apparatus according to claim 17, wherein the instructions further cause the control apparatus to:

in response to the third updated load rate of the primary power supply being not within the first load rate interval after the input voltage of the secondary power supply is adjusted to the third input voltage, perform working sub power supply adjustment on the primary power supply again, so that a fourth updated load rate of the primary power supply after the adjustment is performed falls within the first load rate interval.

* * * * *